United States Patent [19]

Schotten

[11] 4,159,249
[45] Jun. 26, 1979

[54] FILTER PLATE SUSPENSION IN A PLATE FILTER PRESS

[75] Inventor: Alfons Schotten, Düren, Fed. Rep. of Germany

[73] Assignee: Eberhard Hoesch & Söhne GmbH & Co., Düren, Fed. Rep. of Germany

[21] Appl. No.: 841,311

[22] Filed: Oct. 11, 1977

[30] Foreign Application Priority Data

Oct. 12, 1976 [DE] Fed. Rep. of Germany ....... 2645964

[51] Int. Cl.² ............................................. B01D 25/00
[52] U.S. Cl. .................................................. 210/230
[58] Field of Search ............... 210/224, 225, 226, 227, 210/228, 229, 230, 231, 232, 236

[56] References Cited

U.S. PATENT DOCUMENTS

| 2,192,868 | 3/1940 | Malkin | 210/224 |
| 3,563,386 | 2/1971 | Kunig | 210/230 |
| 3,624,778 | 11/1971 | Weber | 210/230 |

FOREIGN PATENT DOCUMENTS 1109647  6/1961  Fed. Rep. of Germany ........... 210/224

OTHER PUBLICATIONS

Sperry Filter Presses–Booklet, 1957, pp. 14, 25, 27, D. R. Sperry & Co.

*Primary Examiner*—Theodore A. Granger
*Attorney, Agent, or Firm*—Spencer & Kaye

[57] ABSTRACT

A plate filter press has a plurality of filter plates; an overhead guide carrier extending in the length dimension of the press and a suspension displaceably supporting each filter plate on the guide carrier. The filter plates are oriented, with their flat sides, perpendicularly to the length dimension. The suspension comprises first, second and third guide tracks affixed to the guide carrier and extending parallel to one another in the length dimension. The first and second guide tracks define a first guide plane, while the third guide track lies in a second guide plane extending parallel-spaced from the first guide plane. Each filter plate has spaced first, second and third guide elements (such as rollers) engaging the first, second and third guide tracks, respectively. The first and second guide elements are spaced transversely to the length dimension; the third guide element is spaced from the first and second guide elements in the direction of the length dimension.

18 Claims, 7 Drawing Figures

FILTER PLATE SUSPENSION IN A PLATE FILTER PRESS

BACKGROUND OF THE INVENTION

This invention relates to a plate filter press having filter plates which are longitudinally displaceably suspended from a guide carrier.

A plate filter press of the above-outlined type is disclosed, for example, in German Pat. No. 1,109,647. In the arrangement described therein a swinging motion of the plates during their shift in the length dimension of the press has been sought to be eliminated by providing each filter plate with two guide rollers running on two parallel tracks. The two rollers are provided on the one and the other side of the plane defined by the filter plate. Since, for structural reasons, the two tracks are relatively close to one another, rocking motions of the plates about an axis connecting the points of engagements of the one and the other roller cannot be entirely prevented. In order to eliminate such rocking motions, in the known construction, the lateral edges of each plate are provided with guide lugs by means of which each plate is laterally supported by laterally arranged pull rods of the press closing device. Since in case of suspended filter plates, the plate shifting device exerts a displacing force on the individual filter plates preferably in the zone of the suspension, the known construction has the disadvantage that during the longitudinal displacement of the filter plates frictional forces are generated which oppose the displacing forces and which act on the filter plates through the lateral lugs at a significant distance from the location of engagement with the displacing members of the plate shifting device. As a result, the plate suspension is exposed to significant stresses. In plate filter presses which have no lateral pull rods, the possibility of providing the above-discussed lateral support is altogether nonexistent.

SUMMARY OF THE INVENTION

It is an object of the invention to provide an improved suspension with which the above disadvantages are eliminated, so that particularly in case of large filter presses, all tilting moments exerted on the filter plates are taken up in the zone of the plate guidance and simultaneously, a stable, tilt-free guidance of the filter plates is ensured during their longitudinal displacement.

This object and others to become apparent as the specification progresses, are accomplished by the invention, according to which, briefly stated, the plate filter press has a plurality of filter plates; an overhead guide carrier extending in the length dimension of the press and a suspension displaceably supporting each filter plate on the guide carrier. The filter plates are oriented, with their flat sides, perpendicularly to the length dimension. The suspension comprises first, second and third guide tracks affixed to the guide carrier and extending parallel to one another in the length dimension. The first and second guide tracks define a first guide plane, while the third guide track lies in a second guide plane extending parallel-spaced from the first guide plane. Each filter plate has spaced first, second and third guide elements (such as rollers) engaging the first, second and third guide tracks, respectively. The first and second guide elements are spaced transversely to the length dimension; the third guide element is spaced from the first and second guide elements in the direction of the length dimension.

The above-outlined arrangement has the advantage that each filter plate is supported on the guide carrier at three points and is thus supported in a statically definite stable manner. The acceleration forces exerted on the individual filter plates in the course of their displacement during the opening phase of the press are fully taken up by the third guide element. In plate filter presses wherein the filter plates are shifted open manually, the three-point suspension has the advantage that, in contradistinction to the known filter plate structures, a single attendant suffices for manually displacing the plates to effect opening of the filter press, because the filter plate guide element—which is arranged at a distance from the filter plate plane and which, in this instance, has to be arranged as a "trailing" component—takes up the tilting moment imparted to the filter plate by the opening force exerted thereon. The three-point suspension likewise prevents a turning motion of the filter plates about a vertical axis passing through the guides. In plate filter presses having a filter plate shifting device, the third guide element has to be arranged as a "leading" component because the tilting moment derived from the acceleration forces has to be taken up.

According to a feature of the invention, the guide track of the third guide element extends between the guide tracks of the two other guide elements. This arrangement has the advantage that by means of the two guide elements of the first guide plane a swinging of the filter plates about an axis extending perpendicularly to the filter plate plane can be prevented, while by means of the third guide element the possibility of a tilting of the filter plate about an axis lying in the filter plate plane is excluded.

In accordance with another feature of the invention, the guide carrier is constituted by a T-beam, the flange of which constitutes the first guide plane. The leg (web) portion of the "T" is provided with a guide arrangement for the third guide element traveling in the second guide plane. With this arrangement the guide carrier (which, at the same time forms part of the press frame) may be of particularly compact construction. In a large plate filter press, it is expedient to utilize an I-beam as the guide carrier in order to ensure the required stiffness for the given span. Advantageously, the upwardly oriented longitudinal outer edge zones of the lower flange of the beam define the first guide plane and further, the guide track for the third guide element is arranged as closely to the beam web as possible so that this guide track is practically centrally positioned between the two other guide tracks. In case an I-beam is used as the guide carrier, this arrangement has the advantage that the guide elements are, in a large measure, protected by the lower flange of the beam from the often corrosive fumes emanating from the press. It is a further advantage of this arrangement that the guide elements and the filter plate shifting device (which, if present, may extend in the web zone of the I-beam between the two flanges) are accessible from the outside and thus maintenance and monitoring operations may be effected in a simple and continuous manner.

In accordance with a further feature of the invention, the third guide element carries locking and/or drive arrangements which can be coupled with the drive arrangements of a plate displacing device. The locking arrangement provides that upon conclusion of the filtering process and upon discontinuing the closing pressure, the filter plate stack remains, by means of the locking arrangement, closed and thus the filter cakes contained between the plates are prevented from inadvertently dropping out. The filter cakes fall out consecutively, and only as the outermost filter plate of the plate stack is, either manually or by means of a plate shifting device, displaced subsequent to its unlocking from the remainder of the stack and thus a space appears between the shifted filter plate and the stack. In filter plate presses having a plate shifting device, an automatic release may be effected by the drive member of the plate shifting device by virtue of a structural combination of the plate locking and plate driving (shifting) arrangement. Further, by arranging the drive components in the zone of the third guide element, the shifting force attacks the filter plates at particularly advantageous locations.

In accordance with a further feature of the invention, the guide elements are connected, expediently by means of carrier arms, with transverse yokes to which the filter plates are secured. This arrangement has the advantage that external forces exerted on the suspension are, in a large measure, taken up within the suspension itself and have thus no effect on the connecting structure between the transverse yoke and the filter plates. Consequently, the connecting structure between yoke and filter plate can be designed solely for supporting the weight of the latter.

In accordance with a further feature of the invention, each transverse yoke is connected with the associated filter plate in such a manner that the transverse yoke is pivotal about its longitudinal axis between predetermined limits and further, elastic return elements are provided. This arrangement is advantageous in that in the plate filter press an end plate and a head plate may be used which also can be suspended from the guide carrier. The end plate and the head plate are connected with one another by the pull rods supported swivelably at the end plate and the head plate to compensate for oblique positions of the filter plate stack. The elastic returning elements are so selected that in the closed, but non-compressed filter plate stack the weight of the enclosed filter cakes cannot push the filter plates apart. Further, the elastic return elements permit, within usual operational limits, pivotal motions in case when during the closing of the filter press, the filter plate face arriving into abutting engagement is situated at an oblique angle with respect to the filter face engaging the displaceable head plate. In this connection it is further of advantage to connect the transverse yoke with the filter plate in such a manner that the transverse yoke is pivotal about a vertical axis so that an oblique positioning of the filtering face engaging the end plate may be equalized not only about a horizontal transverse axis but also about a vertical transverse axis.

DESCRIPTION OF THE PREFERRED EMBODIMENTS

Figure 1:
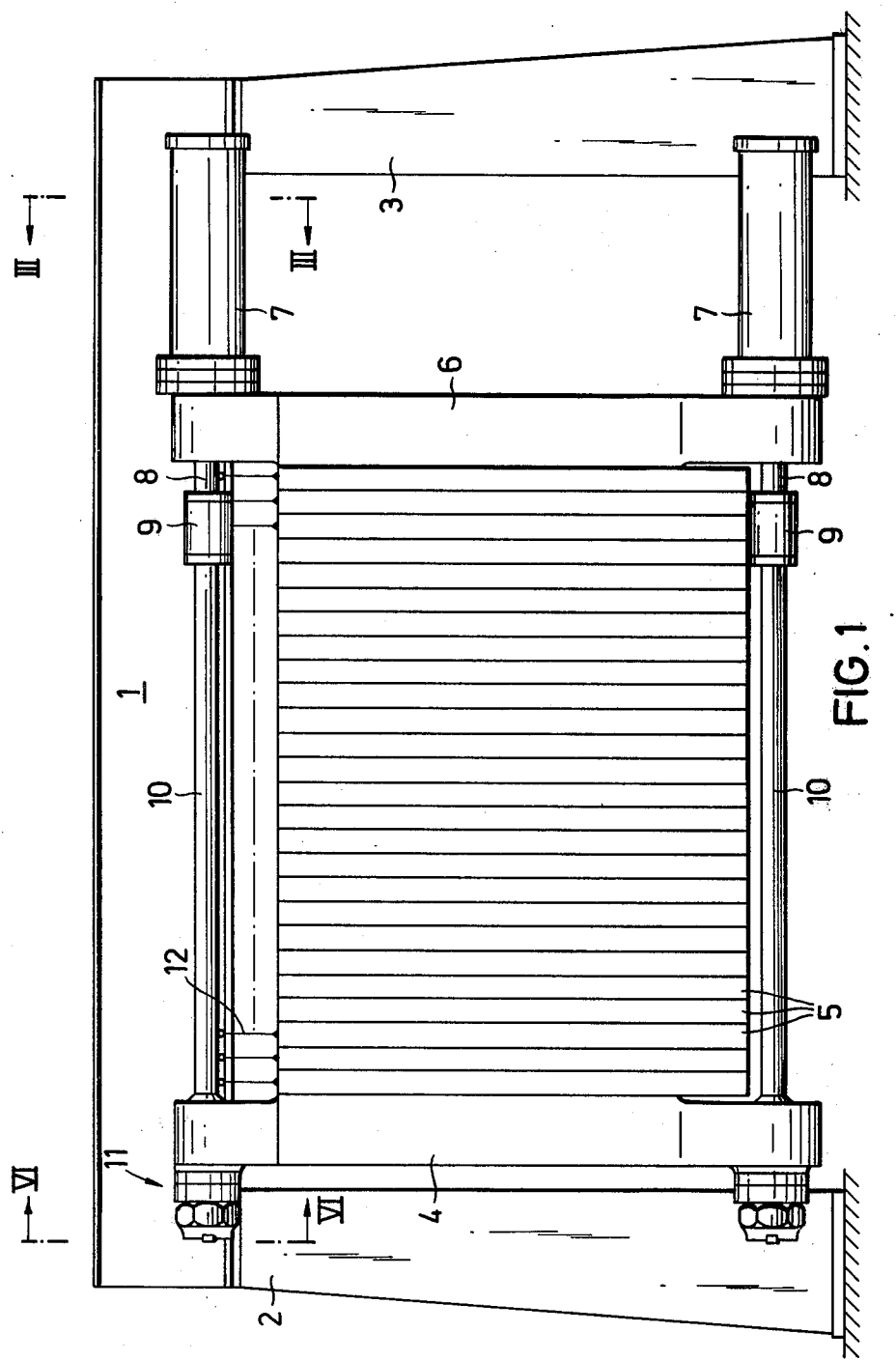
FIG. 1 is a side elevational view of a plate filter press (shown in a closed position) incorporating the invention.

Turning now to FIG. 1, the plate filter press illustrated therein in its closed position has a guide carrier 1 which, at both ends, is supported by upright stands 2 and 3. The guide carrier is an I-beam, from the lower flange of which there are suspended an end plate 4, a plurality of filter plates 5 as well as a head plate 6. The end plate 4 is stationarily secured to the guide carrier 1 while the head plate 6 is supported longitudinally shiftably thereon. The filter plates 5 are connected to the lower flange of the guide carrier 1 by means of suspensions 12 which permit a shift of the individual filter plates (during the opening and closing of the plate filter press) in the direction of the length dimension of the guide carrier 1 (that is, along the longitudinal axis of the press). The structure of the suspensions 12 will be described in greater detail in connection with FIGS. 2 to 5.

To the head plate 6, in the corner zones thereof, there are secured four hydraulic piston-and-cylinder units 7. The piston rods 8 of each unit 7 are connected by means of couplings 9 with respective pull rods 10 which, in turn, are coupled with the end plate 4 by means of respective spherical bearings 11. The hydraulic power units 7 are coupled, in a manner not shown, with a hydraulic pressure source through a control arrangement, so that during the filtering process, the filter plate stack is compressed with the required closing pressure and, upon conclusion of the filtering process, the head plate 6 is shifted from the closed position shown in FIG. 1 into the open position. For this purpose, the pull rods 10 are coupled with the end plate 4 practically in a longitudinally stationary manner. By means of a plate shifting device of known structure (not shown in FIG. 1), the individual filter plates 5 are, for the purpose of ejecting the filter cakes as well as for plate washing and rinsing, shifted in succession towards the head plate 6 which had earlier been moved in the open position. Before initiating a new filtering operation, the filter plates are all shifted by the hydraulic power units 7 with the intermediary of the head plate 6 towards the end plate 4 and thereafter they are pressed thereagainst with the required closing pressure.

Figure 2:
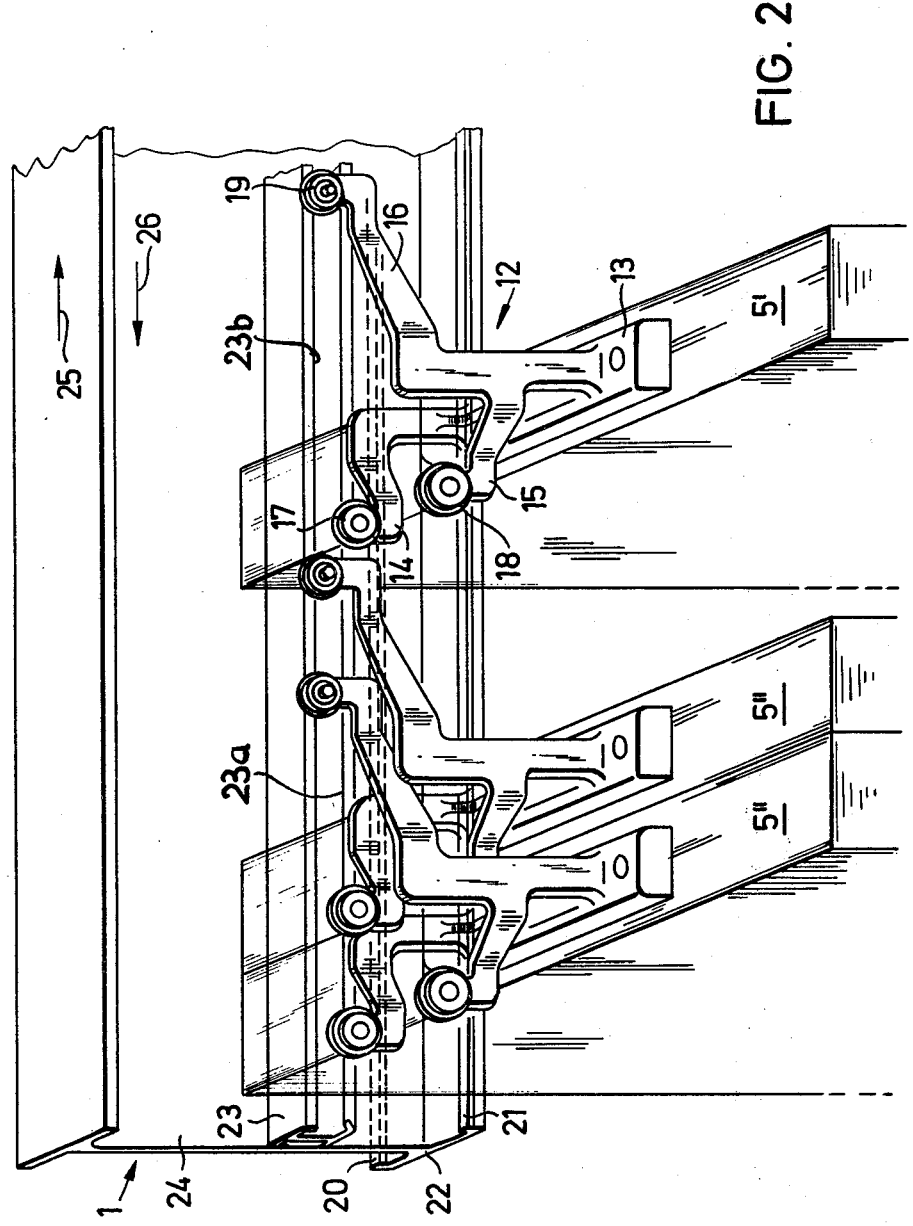
FIG. 2 is a simplified perspective view of a preferred embodiment of the invention.

Turning now to FIG. 2, there is illustrated a preferred embodiment of the individual suspensions 12 associated with the separate filter plates 5', 5". Solely for purposes of illustration, the guide carrier 1 is shown to be transparent. The suspension 12 has a transverse yoke 13 to which there are attached arms 14, 15 and 16 which carry, at their respective free ends, rollers 17, 18 and 19 which function as guide elements. The rollers 17 and 18 are guided on guide tracks 20 and 21 formed along the longitudinal edge zones on opposite sides of the lower flange 22 of the I-beam 1. The guide tracks 20 and 21 lie in a common first guide plane; the rollers 17 and 18 which are situated on either side of a central filter plate plane extending vertically and in the length dimension of the press, constitute the guide elements of the first guide plane. The rollers 17 and 18 are further situated on the same side of a central filter plate plane extending perpendicularly to the length dimension of the press. Stated differently, first, the rollers 17 and 18 are situated at opposite sides of a vertical plane which passes through the center of the filter plate and is parallel to the length of the press and second, the rollers 17 and 18 are situated on the same side of another plane which also passes through the center of the filter plate, but which is perpendicular to the length of the press. The roller 19 which is situated on the other side of the last-named plane (that is, not on the side where the rollers 17 and 18 are arranged), is guided on a guide track 23a which is situated above the first guide plane and which lies in a second guide plane parallel to the first guide plane. The guide track 23a forms part of a beam 23 which is secured to the web 24 of the guide carrier 1. The guide track 23a is disposed as close to the plane of the web 24 as possible to thus ensure an at least approximately median positioning of the roller 19 (which constitutes the guide element of the second guide plane) with respect to the filter plate. The beam 23 further has a longitudinally extending abutment edge 23b which is situated above the guide track 23a and which is normally out of contact with the guide roller 19. Thus, in case of counterclockwise pivotal motions (as viewed in FIG. 2) of the filter plate in response to torques about the rollers 17 and 18, the abutment edge 23b serves as a limiting stop for the then upwardly moving guide roller 19. Stated differently, the guide roller 19 is supported not only from below to take up the weight of the filter plate but is also supported from above to take up tilting forces.

The guide rollers 17 and 18 are arranged with respect to the plane of the associated filter plate in such a manner that the axes of the two rollers 17 and 18 lie in a vertical plane which extends parallel with the filter plate plane and which is at a small distance from the vertical central plane of the filter plate. In practical terms this means that the arms 14 and 15 are relatively short. The arm 16 is, for increasing the stability against tilting moments, longer than the arms 14 and 15. All three arms 14, 15 and 16 of each filter plate suspension 12 are staggered (bent) with respect to the same arms associated with an adjoining filter plate so that the filter plate may be pressed firmly against one another along their sealing edges without being obstructed by rollers of adjoining suspensions. This arrangement may be well seen in FIG. 2 in the case of the two face-to-face positioned filter plates 5". In this connection it is noted that the distance of the guide tracks 20 and 21 from the guide track 23a is so dimensioned that the arm 15 with its roller 18 may freely pass under the guide arm 16 of the adjoining filter plate.

If the filter plate press is opened by means of a filter plate shifting device as it will be discussed in further detail in connection with FIG. 3, the opening process has to be performed in the direction of the arrow 25; the drive members of the plate shifting device expediently engage the individual filter plate assemblies in the zone of the respective rollers 19. Thus, in this case, the arm 16 is arranged to be leading the associated filter plate during the opening motion thereof.

If, on the other hand, the plate filter press, having suspensions as described above, is to be opened manually, that is, an attendant grasps each filter plate by means of an appropriate handle arranged in the lower filter plate zone, the arm 16, in order to absorb the tilting moments generated during such an operation, has to be arranged such that it trails the respective filter plate during the opening motion. Thus, the detection of motion during the press opening operation has to be in the direction of the arrow 26. It is noted that in case the opening motion is in the direction of the arrow 25, the end plate 4 is at the left end of the press (as viewed in FIG. 2) and the head plate 6 is at the right end, whereas if the opening motion is in the direction of the arrow 26, the positions of the end plate 4 and head plate 6 are reversed.

Figure 3:
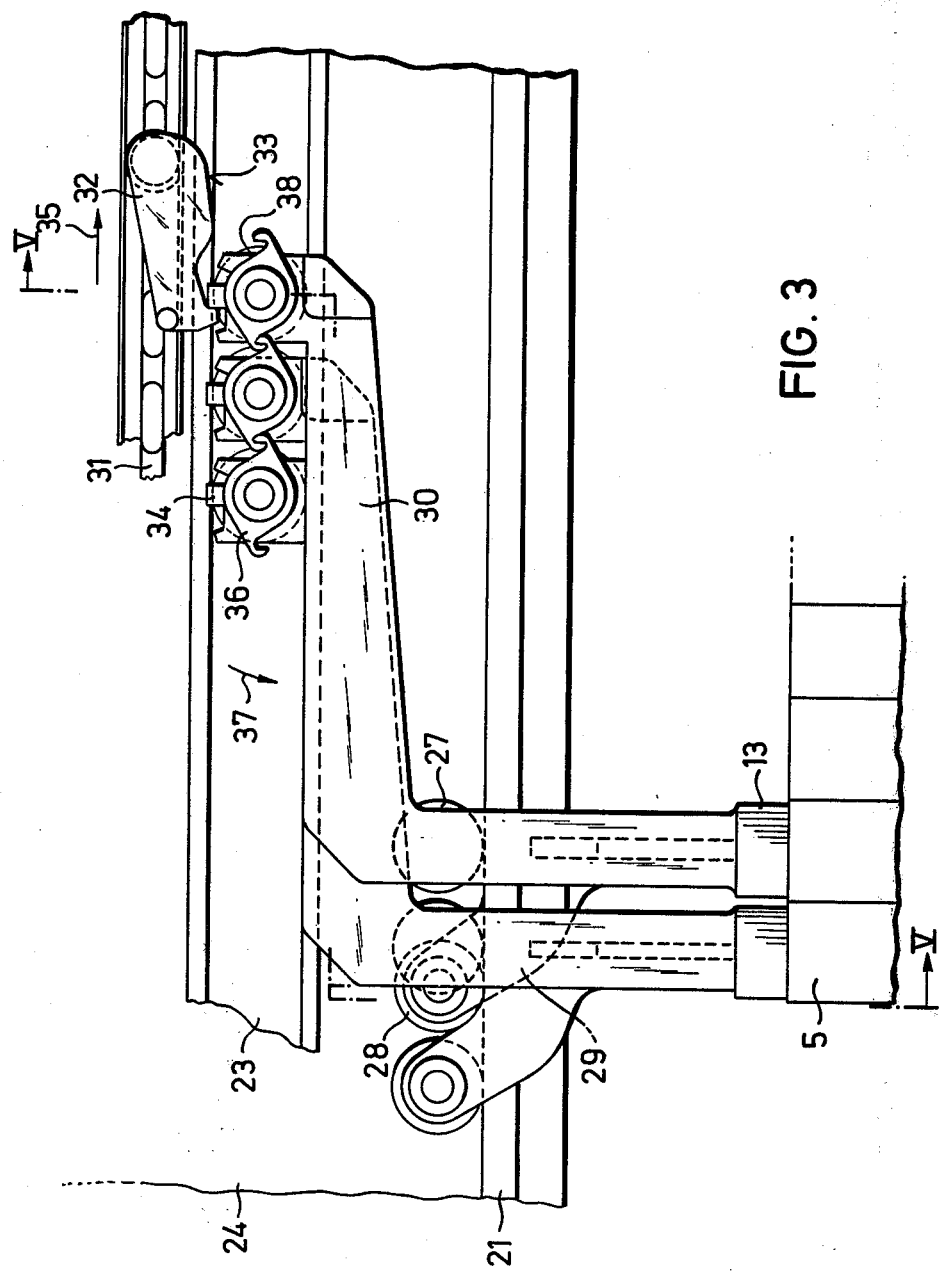
FIG. 3 is a side elevational view of a further preferred embodiment of the invention.
Figure 4:
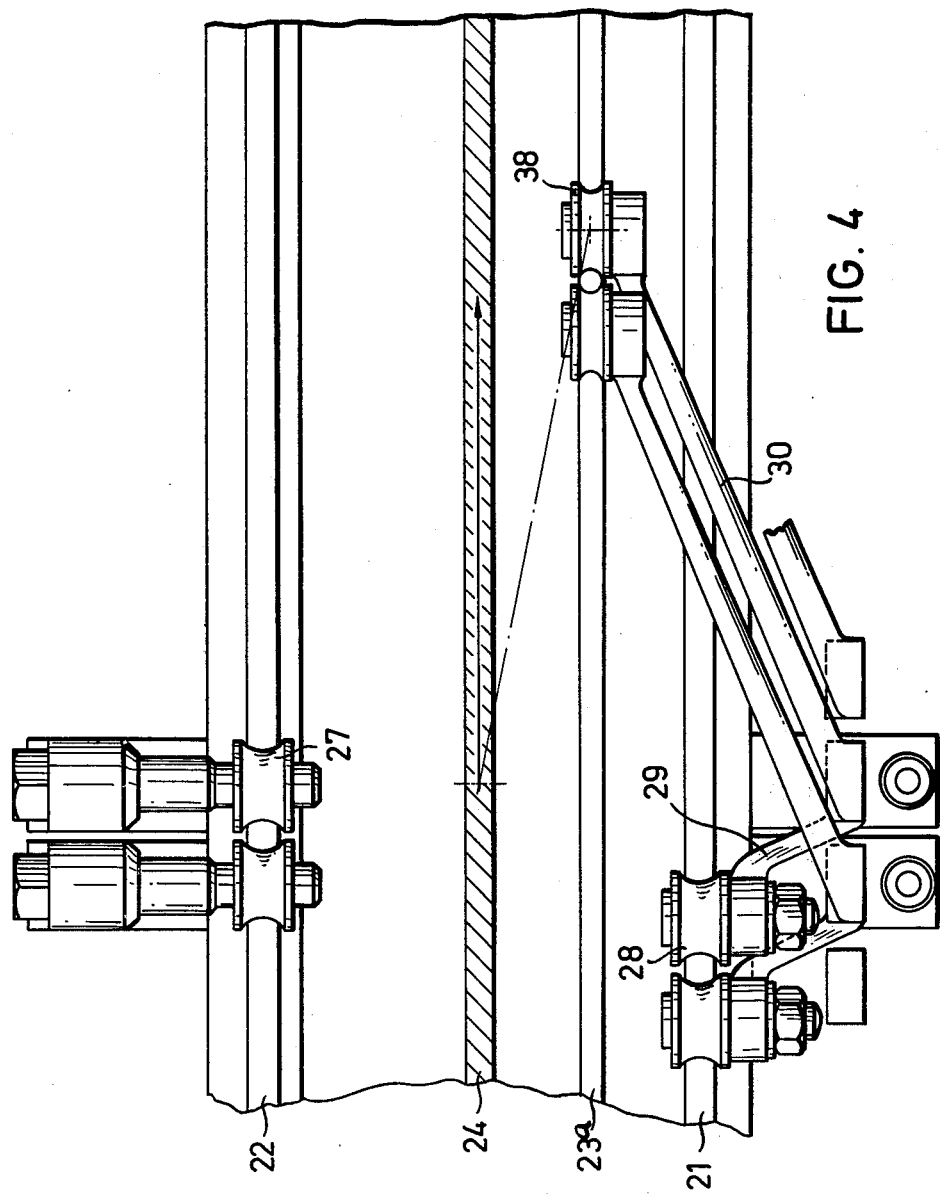
FIG. 4 is a top plan view of the structure shown in FIG. 3.
Figure 5:
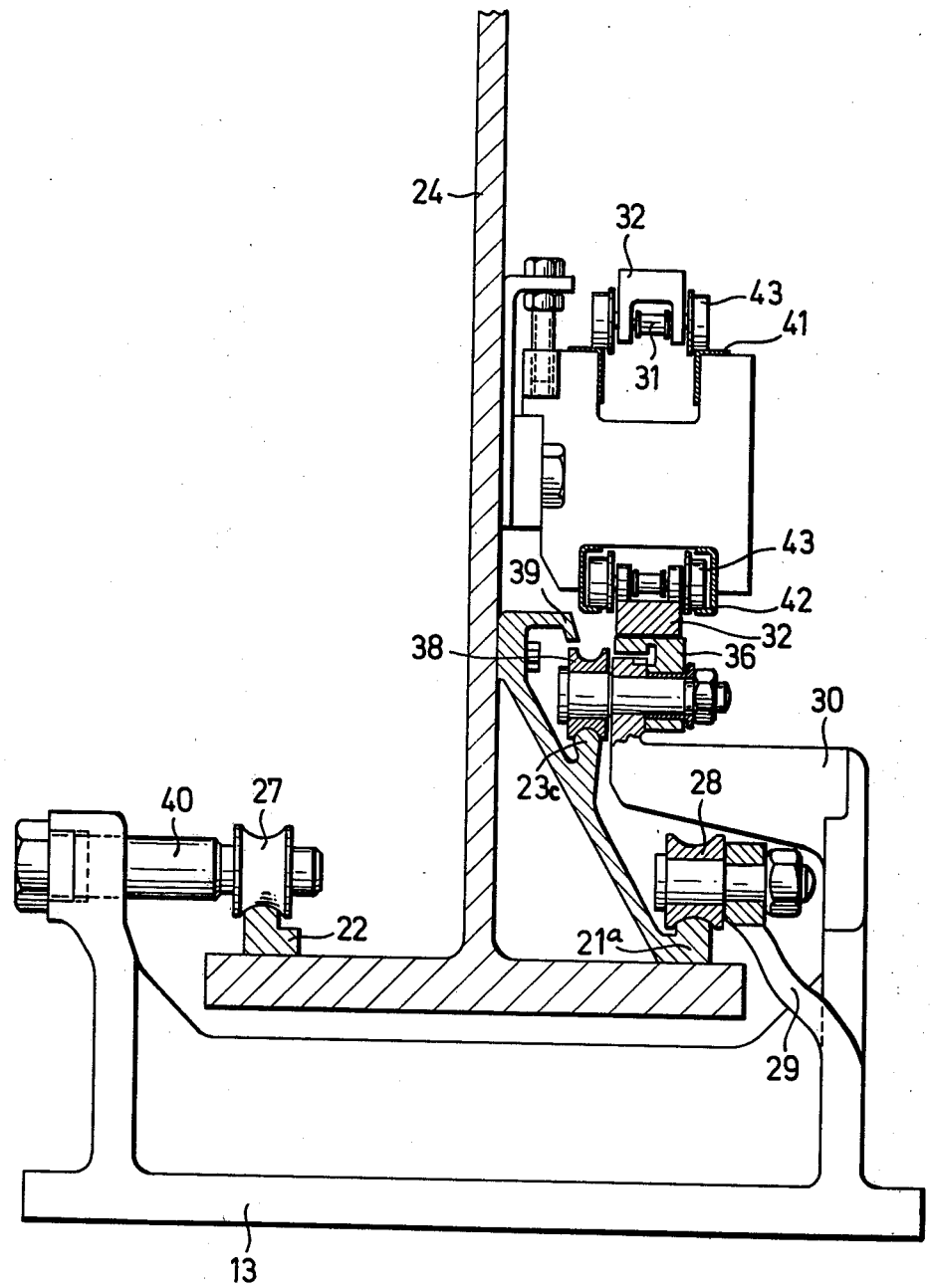
FIG. 5 is a sectional front elevational view taken along lines V—V of FIG. 3.

Turning now to FIGS. 3, 4 and 5, there is illustrated a modified suspension for the filter plates. This arrangement differs from that shown in FIG. 2 essentially in that the rollers 27 and 28 corresponding to the rollers 17 and 18 of the embodiment shown in FIG. 2 are not in alignment with one another: the axis of the roller 27 lies in the central plane of the filter plate 5, whereas the axis of the roller 28 extends parallel-spaced from that plane and is secured to a correspondingly longer arm 29. The arrangement of the arm 30 equivalent to the arm 16 corresponds to the structure illustrated in FIG. 2.

In the embodiment illustrated in FIGS. 3, 4 and 5, for the opening of the filter press, a filter plate shifting device is provided which comprises in essence an endless drive chain 31 traveling above the guide beam 23 and on which, in predetermined distances, pawls 32 are pivotally secured. Each arm 30 has an upwardly oriented camming lug 34, while each pawl 32 has a follower edge 33. As the pawls 32 move, in the direction of the arrow 35, over the series of camming lugs 34, the latter, in cooperation with the follower edges 33, keep the pawls 32 in a withdrawn position with respect to the arms 30. Only when the last lug 34 (as viewed in the direction of the arrow 35) is reached, can the pawl 32 pivot downwardly (counterclockwise) and engage, behind the lug of the outermost filter plate and carry the same in the direction of the arrow 35.

The embodiment illustrated in FIGS. 3, 4 and 5 further includes a locking device which comprises in essence a spring-biased S-shaped dual pawl 36 pivotally secured to the arm 30 of each filter plate 5. The closing force of the spring (not shown) affecting the pawl 36 acts in the direction of the arrow 37. As seen in FIG. 3, the pawls 36 of successive filter plates 5 are in an inter-engaging locking relationship with one another. The lug 34 is fixedly attached to the dual pawl 36 so that when the pawl 32 is in a hooking engagement with a lug 34, the pawl 32 traveling with the chain 31 in the direction of the arrow 35 pulls the lug 34 with it, whereby a torque is exerted on the associated pawl 36. This torque causes the pawl 36 to rotate against the spring bias (clockwise, as viewed in FIG. 3) whereby it is disengaged from the adjoining pawl 36. Thus, the outermost filter plate 5 of the still-locked stack is unlocked and is released from the remainder of the filter plates (filter plate stack) without, at the same time, releasing the remaining plates of the stack.

The relationship of the rollers 27, 28 and 30 to one another can be well seen in FIG. 4. It may be further observed that the arms 29 and 30 which lie on the same side of the web 24 of the guide carrier 1 are staggered with respect to one another in such a manner that the individual plates can be firmly pressed to one another without obstruction by the components 29 and 30 belonging to adjacent filter plates.

FIG. 5 illustrates additional details of the structure shown in FIG. 3. The guide track 21a (corresponding to the guide track 21 in FIG. 2) of the roller 28 as well as the guide track 23c (corresponding to the guide track 23a in FIG. 2) of the roller 38 are formed on a single section beam which is affixed to the guide carrier 1. The section beam has a flange 39 (corresponding to the component 23b in FIG. 2) which extends parallel to the guide track 23c and at a small distance above the guide roller 38, so that in case the latter lifts off the track 23c, it abuts—and is thus retained by—the flange 39.

Contrary to the rollers 28 and 38 which are axially retained by their respective bearing pins, the roller 27 is freely removable from its pin 40, which is threadedly secured to the yoke 13. This arrangement has the advantage that for replacing a damaged filter plate, after loosening and axial removal of the pin 40, the filter plate may be swung about the guide track 23c after a slight lifting. Then only the roller 38 has to be lifted off its guide track.

FIG. 5 further schematically illustrates the plate shifting device as well. The latter is secured above the guide track 23c and has two guides 41 and 42 on which, supported by rollers 43, there are carried the upper and the lower reach, respectively, of the conveyor chain 31. The schematically illustrated pawls 32 are pivotally secured to the chain 31 as it was described in more detail earlier. On the bearing pin of the roller 38 there is further articulated, on the other side of the arm 30, the spring-biased dual pawl 36 of the plate locking and plate shifting device.

Figure 6:
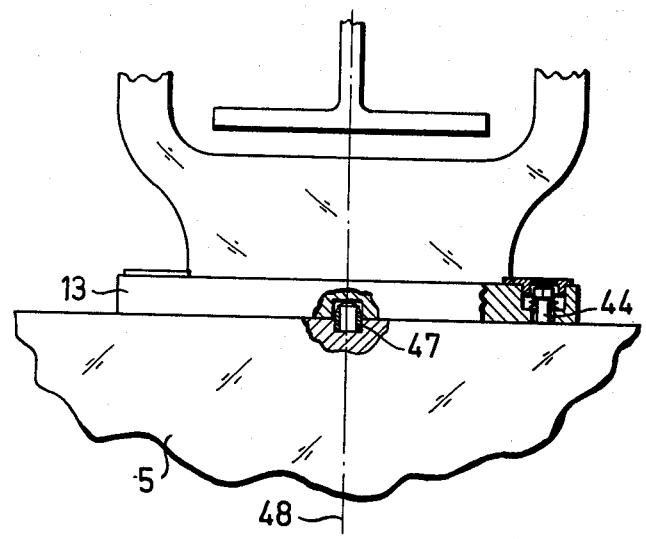
FIG. 6 is a front elevational view, partially section, of a detail showing the connecting structure between a filter plate and its suspension.
Figure 7:
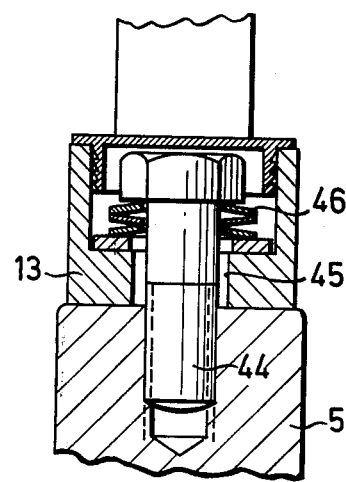
FIG. 7 is an enlarged sectional view of a detail of FIG. 6.

As illustrated in FIG. 6, the transverse yoke 13 is secured by means of screws 44 to the two outer sides of the respective filter plate 5. As may be observed from the enlarged illustration in FIG. 7, in the transverse yoke 13, the hole 45 for the screws 44 is so dimensioned that a sufficient play is maintained. The transverse yoke 13 is, with the interposition of hard spring elements, for example, spring discs 46, tightened with the filter plate 5, so that in case of certain stresses, the transverse yoke may tilt with respect to the associated filter plate 5.

As further shown in FIG. 6, in the central vertical axis passing through the transverse yoke 13 and the associated filter plate 5, there is arranged a centering pin assembly 47 which projects beyond the upper edge of the filter plate 5, and the upper end of which has a spherical configuration. Thus, the transverse yoke 13, in case of certain stresses, may tilt between the limits defined by the spring discs 46 while the central axis of the filter plate remains accurately positioned with respect to the suspension. This arrangement further permits, within narrow limits, twists of the filter plate with respect to the transverse yoke about the vertical central axis 48, so that in case of a certain oblique positioning of the filter plates with respect to one another, a corresponding realignment of the filter plates under the effect of the closing pressure is feasible without transmitting these stresses to the suspensions. Further, the spring discs 46 have to be of such a rigidity that a spreading of the unstressed but interconnected filter plates (because of a yielding of the spring discs 46) under the effect of a non-vertical force component of the weight of the filter cake is prevented.

It will be understood that the above description of the present invention is susceptible to various modifications, changes and adaptations, and the same are intended to be comprehended within the meaning and range of equivalents of the appended claims.

What is claimed is:

1. In a plate filter press having a plurality of filter plates; an overhead guide carrier extending in the length dimension of the press; suspension means displaceably supporting each filter plate on the guide carrier; the filter plates being oriented with their flat sides generally perpendicularly to the length dimension; each filter plate having a first central plane extending perpendicularly to the length dimension and a second central plane extending vertically and being parallel to the length dimension; the improvement wherein said suspension means comprises first, second and third guide tracks affixed to said guide carrier and extending parallel to one another in said length dimension; said first and second guide tracks defining a first guide plane; said third guide track lying in a second guide plane extending parallel-spaced from said first guide plane; each said filter plate has spaced first, second and third guide elements engaging said first, second and third guide tracks, respectively; said first and second guide elements being situated at opposite sides of and spaced from said second central plane; at least one of said first and second guide elements engaging its respective guide track at a location spaced from said first central plane; and said third guide element engaging said third guide track at a location situated spaced from said first central plane on that side thereof which is oriented away from the location of engagement of said at least one guide element.

2. A plate filter press as defined in claim 1, wherein the location of engagement of said first guide element is aligned with said first central plane.

3. A plate filter press as defined in claim 2, wherein the locations of engagement of said second and third guide elements are on opposite sides of said second central plane.

4. A plate filter press as defined in claim 1, wherein said first, second and third guide elements are constituted by first, second and third rollers, respectively.

5. A plate filter press as defined in claim 1, wherein said first guide element is substantially in alignment with said second guide element in a horizontal direction oriented perpendicularly to said length dimension.

6. A plate filter press as defined in claim 1, wherein said third guide track extends between said first and second guide tracks.

7. A plate filter press as defined in claim 1, wherein said guide carrier is a beam having a web and a transverse flange; said first and second guide tracks being arranged on said flange on opposite sides of said web; said third guide track being arranged on said web.

8. A plate filter press as defined in claim 7, wherein said first and second guide tracks are formed on said flange; further comprising an additional guide carrier affixed to said web; said third guide track being formed on said additional guide carrier.

9. A plate filter press as defined in claim 7, wherein said first and second guide tracks are arranged on said side of said flange that is oriented towards said web.

10. A plate filter press as defined in claim 7, further comprising an abutment edge fixedly carried by said web; said abutment edge extending parallel-spaced from said third guide track normally at a small distance from said third guide element; said abutment edge constituting a stop for said third guide element if the latter is lifted off said third guide track.

11. A plate filter press as defined in claim 7, wherein said first guide track is directly carried on said flange at one side of said web; further comprising an additional guide carrier affixed to said flange and said web on that side thereof which is oriented away from said first guide track; said second and third guide tracks being formed on said additional guide carrier.

12. A plate filter press as defined in claim 1, wherein each filter plate is associated with a separate transverse yoke; first securing means for attaching the respective first, second and third guide elements to said transverse yoke; and second securing means for attaching said transverse yoke to the respective filter plate.

13. A plate filter press as defined in claim 12, wherein said first securing means is formed of first, second and third carrier arms attaching said first, second and third guide elements, respectively, to said transverse yoke.

14. A plate filter press as defined in claim 12, wherein said transverse yoke has a longitudinal axis; said second securing means providing for a limited freedom of motion of said transverse yoke about its longitudinal axis relative to the associated filter plate; said second securing means including elastic resetting means opposing displacements of said transverse yoke about its longitudinal axis relative to the associated filter plate.

15. A plate filter press as defined in claim 14, wherein said transverse yoke has a vertical axis; said second securing means providing for a limited freedom of motion of said transverse yoke about its vertical axis relative to the associated filter plate.

16. A plate filter press as defined in claim 1, further comprising a plate shifting device comprising conveyor means traveling in the direction of said length dimension; spaced first drive elements secured to said conveyor means; and second drive elements, a separate one of said second drive elements being secured to each said third guide element for cooperation with said first drive elements.

17. A plate filter press as defined in claim 16, further comprising a locking device for maintaining the filter plates in an interlocked stack in the closed state of the filter press and prior to the operation of said plate shifting device; said locking device comprising locking elements, a separate one of said locking elements being secured to each said third guide element and being arranged for cooperation with said first drive elements.

18. A plate filter press as defined in claim 1, wherein the location of engagement of said third guide element is at a greater distance from said first central plane than that of the location of said at least one guide element.

* * * * *